May 19, 1959 J. VALEMBOIS 2,886,951
APPARATUS FOR THE UTILIZATION OF THE ENERGY OF WAVES
Filed April 9, 1953 3 Sheets-Sheet 1

Inventor
Jean Valembois

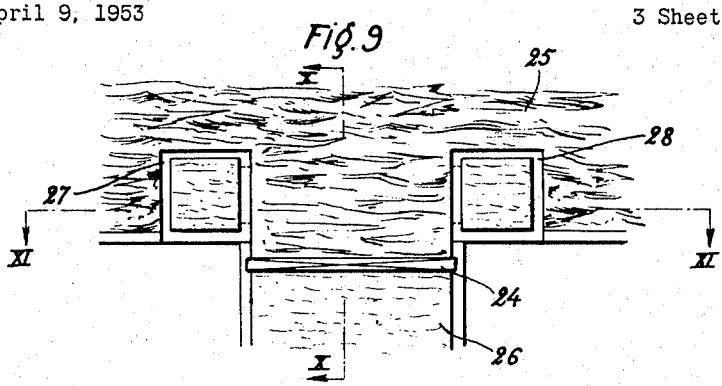
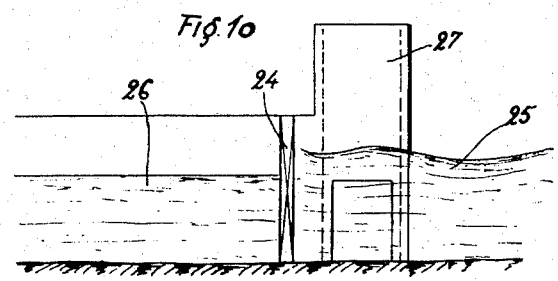
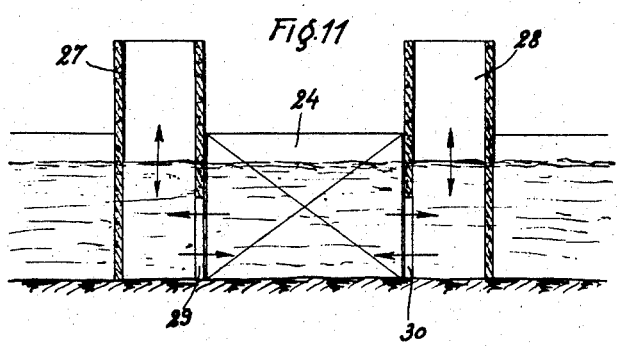
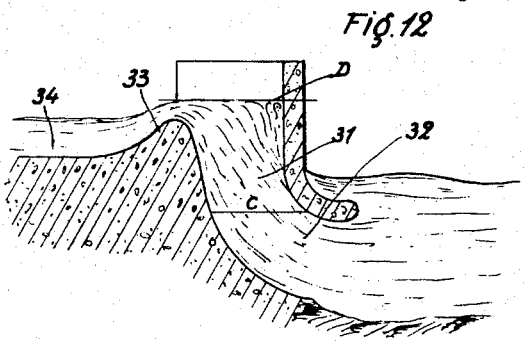
Inventor
Jean Valembois

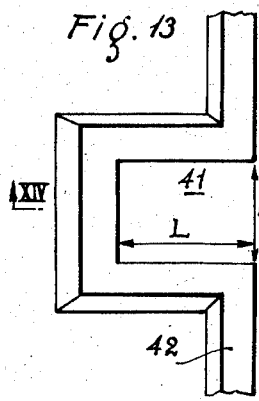
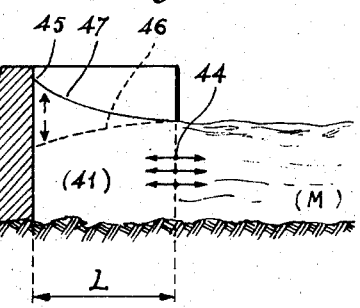
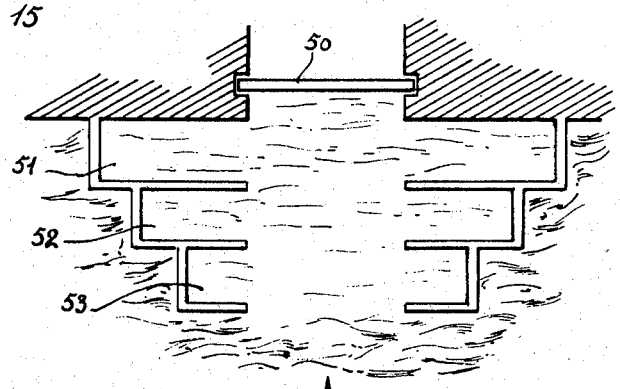

United States Patent Office 2,886,951
Patented May 19, 1959

2,886,951

APPARATUS FOR THE UTILIZATION OF THE ENERGY OF WAVES

Jean Valembois, Becon-les-Bruyeres, France, assignor to Electricite de France (Service National), Paris, France, a French national service Application April 9, 1953, Serial No. 347,810

Claims priority, application France April 12, 1952

12 Claims. (Cl. 61—20)

The present invention is concerned with a process and means for utilizing the energy of waves.

It is known that the periodical variations of level created by the waves at any point on the sea cause in its depths variations of pressure having the same period as the said waves. The amplitude of these variations of pressure decreases exponentially as the depth increases.

According to the invention, the said periodic variation of pressure is employed for causing oscillations of a mass of water in a hydraulic resonator tuned to the period of the variation of pressure or to a neighbouring period.

The resonator acts like an obstacle partly reflecting the swell, the network of stationary waves which it creates comprising an antinode of flow (that is, a node of pressure) perpendicular to the resonator. This antinode of flow is due to the fact that the rate of flow in the resonator is high, the external variation of the water level being amplified inside the resonator owing to the resonance effect.

The swell happening to strike any obstacle such as a sea-wall, a breakwater, or any place on the coast, is reflected and gives rise to a system of stationary waves with an antinode of pressure normal to the obstacle. If at any place on this obstacle one disposes a resonator, owing to the application of the principle of the process according to the invention, the pressure antinode at that place is transformed practically into an antinode of flow (node of pressure). In other words, the placing of the hydraulic resonator at a given point is equivalent to creating at that point a hydraulic impedance which is in the neighbourhood of zero.

The invention has also for its object the devices for carrying out the above process, devices which constitute the hydraulic resonators. According to the invention, such a resonator may be constituted by a channel starting from a lower end, always immersed, acting as an inlet orifice, and ending at an upper end always out of the water, that is to say, situated above the highest height ever reached by the sea. Such a resonator has a natural frequency determined by its geometrical dimensions and a passing band which depends essentially on the losses of head of the movements of the water in the channel.

Experience shows that in practice the resonators have a band-pass suitable for reacting in a satisfactory manner to the various periods of the principal swell met with at a given place on the coast. It is the case, for example, for the North Sea, where the period of the swell is of the order of five to ten seconds and where a resonator tuned to an intermediate period gives perfectly satisfactory results.

The natural period of the resonator depends on its geometrical shape and on the level of the water in the resonator. In order to render it independent from this level, which varies either with the tide or during the oscillations of the water in the resonator, the invention provides a resonator of special shape, characterised in that its cross-section decreases from the bottom to the top between two extreme levels corresponding to the lowest and highest levels reached by the level of the water in the resonator.

The device according to the invention may receive the most varied applications, whether it is required to reduce the amplitude of the oscillations of the level in front of a sea-wall, or to create, for example, a calm zone inside a harbour. The device used in such cases will generally comprise two or several resonators disposed on either side of the sea-wall or of the zone to be protected.

Although the band-pass of a resonator may generally be sufficiently large, as it has been mentioned before, for reacting in a satisfactory manner to the various frequencies of the swell met with in a given place, the simultaneous utilization of two or several resonators tuned to different frequencies may also be provided for.

The invention concerns also the application of the hydraulic resonators for the purpose of the utilization of the energy of the swell: the resonator may be for example put in communication with a basin by means of an overfall the sill of which may be situated well above the level of the sea.

The invention also has for its object an alternative arrangement of the devices mentioned before, which has the advantage of being generally simpler and more economical to carry out. This alternative comprises one or several hydraulic resonators with a free surface constituted by a basin or a combination of basins communicating with the sea.

A quarter-wave resonator may be constituted for example by a rectangular basin open at one end and closed at the other end, the length of this basin being of the order of the quarter of the wave-length of the swell to be absorbed and its width being less than one half of the said wavelength.

Resonators of this kind may be easily grouped and combined in any suitable manner for the purpose of constituting protecting devices in front of marine works of all kinds.

The invention will be better understood by the following description with reference to the appended drawings which illustrate diagrammatically, in the way of examples, preferred embodiments of the invention. In these drawings:

Fig. 9 is a plan view of a lock gate protected by two resonators;

Fig. 10 is a sectional view along the line X—X of Fig. 9;

Fig. 11 is a sectional view along the line XI—XI of Fig. 9;

Fig. 12 is a sectional elevation of a water elevator according to the invention;

Fig. 13 is a plan of a simple resonator;

Fig. 14 is a sectional view along the line XIV—XIV of Fig. 13;

Fig. 15 is a plan of a lock gate protected by two groups of resonators;

Fig. 16 is a plan of a protecting arrangement for an outer harbour.

Figure 1:
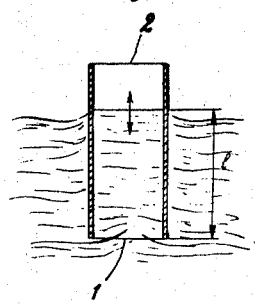
Figs. 1 to 4 show various shapes of resonators.

A first very simple form of resonator such as it is represented in Fig. 1 is constituted by a well or vertical channel of constant cross section and of any shape, starting from one end always immersed 1 and ending at an upper end 2 sufficiently elevated for remaining always out of the water. The periodic variation of pressure created by the swell at the lower end 1 of the resonator so constituted causes the level inside the said resonator to oscillate, the amplitude of the oscillations in the resonator being capable of reaching several times the amplitude at the outside.

Figure 2:
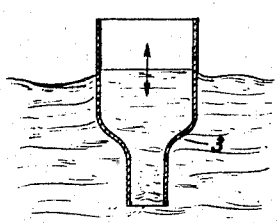

The resonator of Fig. 2 has a certain section up to an intermediate level 3 and an enlarged section above this level. This arrangement permits to obtain a longer natural period being given a dimension in height.

Figure 3:
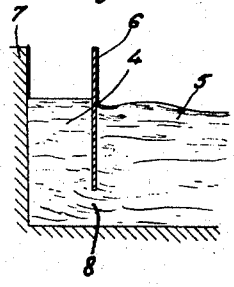

According to the example represented in Fig. 3, the resonator 4 is constituted at the end of a basin 5 in communication with the sea by the erection of a wall 6 forming with the vertical wall 7 of the basin a resonator the inlet orifice of which is provided by a space 8 left between the lower edge of the wall 6 and the bottom of the basin.

Figure 4:
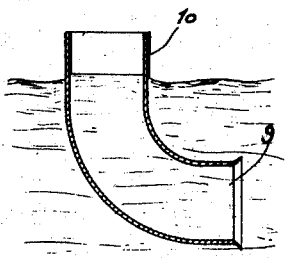

The resonator of Fig. 4 is constituted by a curved channel starting horizontally with an inlet mouth 9 and ending in a vertical chimney 10 open to the atmosphere, expansion chimney in which the water can oscillate freely.

The natural period of resonators of this kind may be ascertained either by calculation or by experiment, particularly with small scale models. In the case of a vertical resonator of constant cross-section according to Fig. 1, the period is given approximately by the formula $$T = 2\pi (l/g)^{1/2}$$

where $g$ is the acceleration due to gravitation and $l$ is the depth of immersion of the inlet orifice 1, the period $T$ being in seconds. In this manner, a period $T = 6.3$ secs. approximately is found for $l = 10$ m.

Figure 5:
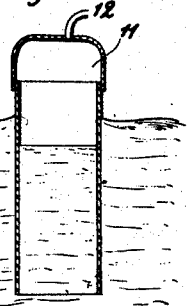
Fig. 5 represents a resonator the frequency of which is adjustable.

In the preceding cases, the upper portion of the resonator is open to the atmosphere and the natural frequency remains sensibly constant within the limits when the depth of immersion of the inlet orifice remains unchanged. Fig. 5 represents a resonator the frequency of which is adjustable. The resonator is surmounted in this case with a cap 11 which is connected by a neck 12 to a source of compressed or of rarefied air. By varying the pressure under the cap it is possible to cause the natural period of the resonator to vary according to circumstances, notably as a function of the natural period of the swell and/or as a function of the depth of immersion of the inlet orifice.

Figure 6:
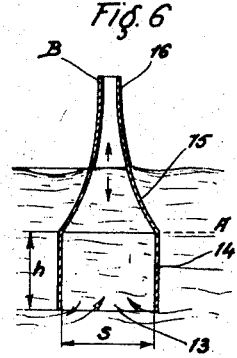
Fig. 6 represents a resonator the frequency of which remains constant when the level of the water inside it varies.

Fig. 6 represents a resonator such that the level of the water inside it may vary between such limits as A and B without modifying its natural frequency. The resonator comprises in this case a lower portion 14 of constant cross-section S, surmounted by a portion 15 of variable cross-section. Calculation and experiment demonstrate that, by a suitable choice of the law of decrease of the section (it will be generally a simple exponential law), it is possible to render the natural period of the resonator practically constant when the level in the well varies between A and B. This period is equal to $2\pi(h/g)^{1/2}$, where $h$ is the height of the portion of constant cross-section and $g$ has the same significance as before.

Figure 8:
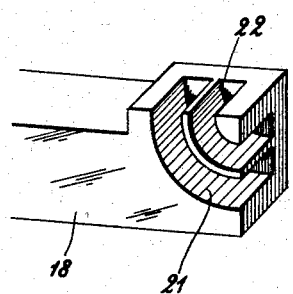
Fig. 8 is a detail view in perspective of a section of one of the resonators of Fig. 7.
Figure 7:
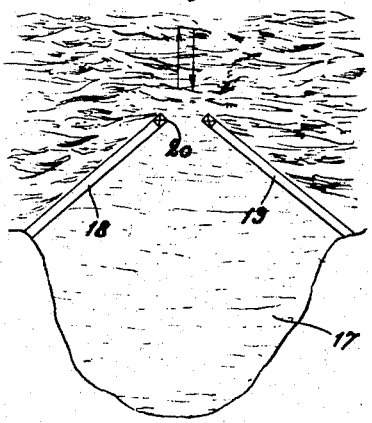
Fig. 7 is a plan of a harbour protected by resonators according to the invention.

Fig. 7 illustrates a first example of the application of the resonators to the protection of a harbour 17 sheltered by two piers 18, 19: the end of each of these piers is equipped with a resonator such as 20, of which Fig. 8 is a detail view, illustrating a double resonator constituted by the combination in parallel of two simple resonators 21, 22 of the model of that of Fig. 4. Such an arrangement permits to reduce the agitation of the sea at the entrance in a similar manner as the agitation in the harbour.

Figs. 9, 10 and 11 show an arrangement for the protection of a lock gate 24 established between the sea 25 and a basin 26. The arrangement comprises two resonators 27, 28 constituted by vertical wells placed on either side of the lock and comprising inlet orifices 29, 30 at the bottom of the walls facing the latter.

The swell which strikes the gate creates in front of the latter a stationary wave, the antinode of vertical motion, that is, of variation of pressure, being against the gate.

If the resonators 27, 28 are tuned to the period of the swell, the oscillation of water in them will assume a large amplitude, creating an important oscillating rate of flow perpendicular to the gate, and transforming the antinode of vertical motion into an antinode of rate of flow (or of horizontal motion) thereby reducing the variation of pressure against the gate.

Experiments with small scale models have shown that with very simple means one manages to reduce the variation of pressure in a ratio of 2 to 1 for periods varying in the ratio of 1 to 2.

Fig. 12 shows an example of the utilization of the energy of the swell: a resonator 31 formed by a vertical wall connected to an inlet mouth 32 directed towards the open sea, is put in communication by means of an overfall 33 with a basin 34, the sill of this overfall being raised well above the level of the sea, the water oscillating in the resonator between the levels C and D for example: the energy of the swell is here utilized to constitute a water elevator. One can besides imagine any other means for utilizing the energy of the swell manifesting itself by oscillations of great amplitude of the water in the resonators.

Alternative arrangements consisting in utilizing resonators with a free surface will now be described with reference to the Figs. 13 to 16.

The simple resonator of Fig. 13 is constituted by a basin 41 of rectangular form generally, provided in a wall 42 erected in the sea (M), the swell having a movement of propagation for example parallel to the wall in the direction of the arrow F. Under the action of the variations of pressure created by the swell at the entrance 44 of the basin (Fig. 14), the water is alternatively forced into the basin then aspirated from the latter, while a reflection takes place on the back wall 45. If the length L of the basin is of the order of the quarter of the wave-length of the swell, a system of stationary waves becomes established with a node of pressure at the entrance of the basin (44) and an antinode of pressure at the bottom (45); the node of pressure at the entrance is accompanied with an antinode of oscillations of the rate of flow manifesting itself by horizontal to-and-fro movements, while the antinode of pressure is accompanied with vertical movements which cause the level of water in the basin to oscillate between a lower limit such as 46 and an upper limit such as 47.

The shape, the dimensions of the basin, the depths at the different places, the shape and the dimensions of the opening are parameters affecting the natural frequency of the resonator which may be ascertained as functions of the periods of the swells to absorb.

Experience shows that it is advantageous to limit the width $l$ of the basin to a value which is less than one half of the wave-length of the swell to be absorbed, the mass of water in the basin then oscillates as a whole in the manner which has just been described. Nothing prevents, however, the erection of larger resonators, but which will be then subdivided into a suitable number of smaller resonators by means of partitions.

Fig. 15 shows a combination of several quarter-wave basins protecting a sea-work, here a lock gate represented diagrammatically at 50. On each side of this gate there has been established a group of three basins 51, 52, 53, disposed in parallel and tuned to different wavelengths. Experiment with small scale models shows that three or four resonators are sufficient to cover in a continuous manner a range of swell periods varying in the ratio of 1 to 2.

A similar arrangement is found in the case of the protection of an outer harbour represented in Fig. 16, the outer harbour being defined by two piers 55, 56 leaving an entrance 57 behind which are established, symmetrically with respect to the axis of the inlet passage, two groups of three resonators 58, 59, 60, tuned to different frequencies.

These resonators tend to absorb the swell propagating itself in the direction of the arrow F for example and to create a zone of calm water under the shelter of the piers. The degree of protection is a function, particularly, of the area covered by the resonators. In this example, if the surface of the whole of the resonators is of the order of S, surface of the passage between the two groups, the attenuation in the range covered is of the order of 5 to 1.

It is well understood that the invention is not limited to the preceding embodiments which have only been described in the way of examples; for instance the arrangement of resonators on each side of a work to be protected is not the only one that is possible, one can consider any other arrangement, and, particularly, the grouping of all the resonators on the same side of the work.

What I claim is:

1. A hydraulic resonator exposed to the periodic variation of pressure caused by waves for causing amplified oscillations of a mass of water in said hydraulic resonator tuned to the period of the variation of pressure or to a neighboring period, the said resonator comprising a multi-sided enclosure communicating permanently at its lower end with the body of water agitated by the waves and having its outer end above the water surface, said resonator being closed on at least three sides by walls which extend vertically above as well as under the mean level of the water whereby a reflection of the energy of the waves is effected towards the said body of water.

2. A resonator as claimed in claim 1, provided with a free surface constituted by an open air basin communicating with the sea.

3. A resonator as claimed in claim 1, having an immersed passage extending up to the surface of the said body of water, said resonator comprising at one end an inlet exposed to the swell and at the other end a reflecting surface; and being tuned to a quarter of the wave-length of the swell to be absorbed.

4. A resonator as claimed in claim 1, having an immersed passage extending up to the surface of the said body of water, said hydraulic resonator being constituted by an open air basin communicating with the sea and the width of which is less than one half of the wave-length of the swell to be absorbed.

5. A resonator as claimed in claim 1, having an immersed passage extending up to the surface of the said body of water, said hydraulic resonator being constituted by an open air basin communicating with the sea and several more resonators in parallel tuned to the same natural frequency.

6. A resonator as claimed in claim 1, having an immersed passage extending up to the surface of the said body of water, said hydraulic resonator being constituted by an open air basin communicating with the sea and several more resonators in parallel tuned to different natural frequencies.

7. A device according to claim 1 in which the walls extend vertically above as well as below the mean level of the water a distance at least equal to twice that of the maximum waves that occur outwards of the enclosure.

8. An apparatus for protecting a maritime work which is exposed to the action of the swell, comprising a passage established between the sea and this work, said passage comprising on at least one side thereof a hydraulic resonator tuned to the period of the dominant swell, the said resonator including a multi-sided enclosure communicating permanently with the sea, being closed on at least three sides by walls which extend vertically above and under the mean level of the sea on a height at least equal to twice that of the maximum waves that occur outwards of the enclosure, whereby the energy of the swell is reflected towards the open sea.

9. An apparatus for protecting a lock gate having one side thereof exposed to the swell of a body of water, comprising on at least one end of the said lock gate at the exposed side a resonator as defined in claim 1, the said resonator having its enclosure provided with a passage which is permanently immersed in the said body of water.

10. An apparatus as set forth in claim 9 including a plurality of resonators, said resonators positioned on each end of said lock gate, the resonators on each end being in alignment with each other.

11. A harbor including a pair of oppositely spaced piers providing an inlet therebetween, an apparatus disposed near the end of each of the piers which form the inlet, said apparatus being constructed as set forth in claim 10.

12. An apparatus comprising a plurality of resonators, each resonator constructed as set forth in claim 1, said plurality of resonators being disposed in alignment with each other and tuned to different natural frequencies.

References Cited in the file of this patent

UNITED STATES PATENTS

| | | |
|---|---|---|
| 905,596 | Smith | Dec. 1, 1908 |
| 2,474,786 | Humphrey | June 28, 1949 |
| 2,658,350 | Magill | Nov. 10, 1953 |

FOREIGN PATENTS

| | | |
|---|---|---|
| 399,131 | Germany | 1924 |